March 6, 1928.
N. S. HILLYARD
1,661,288
COMBINATION DESK CALENDAR
Filed Aug. 1, 1927
3 Sheets-Sheet 1
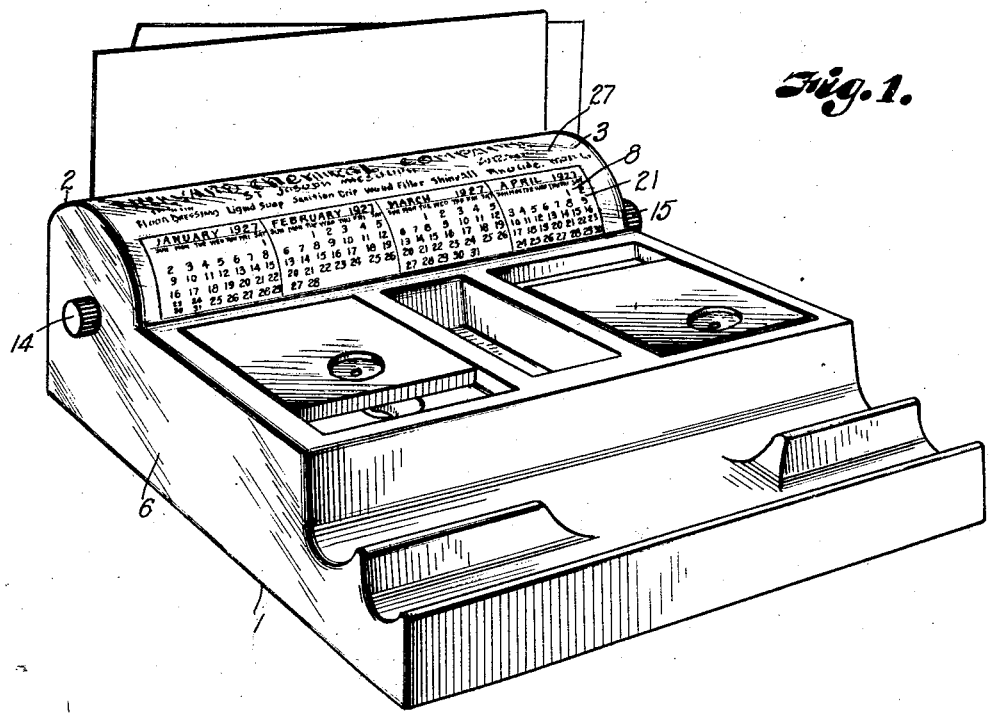
Fig. 1.
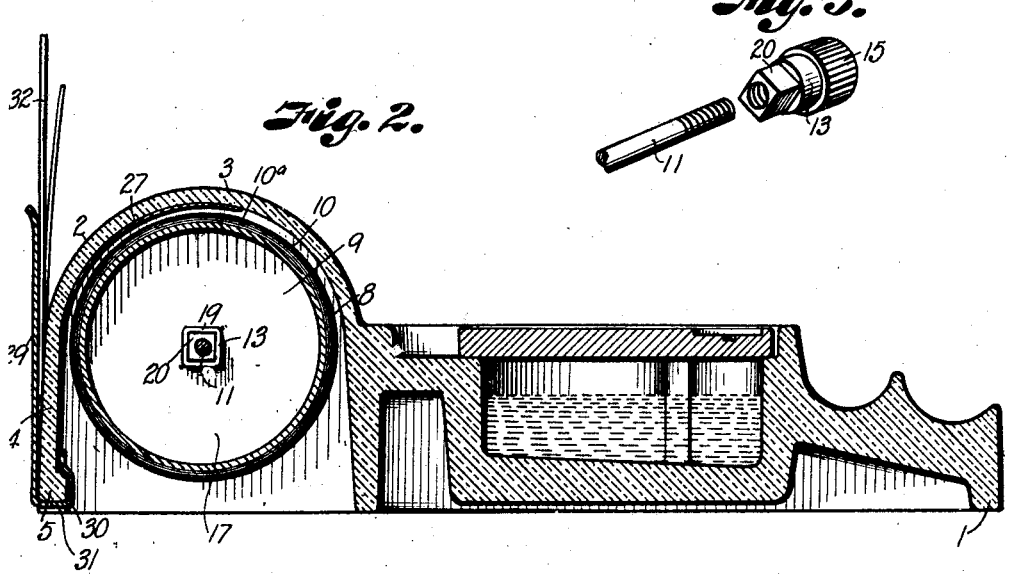
Fig. 2.
Fig. 3.
INVENTOR
Newton S. Hillyard
BY
ATTORNEY March 6, 1928.

N. S. HILLYARD 1,661,288

COMBINATION DESK CALENDAR

Filed Aug. 1. 1927

INVENTOR
Newton S. Hillyard
BY
ATTORNEY

March 6, 1928.

N. S. HILLYARD 1,661,288

COMBINATION DESK CALENDAR

Filed Aug. 1, 1927

| JULY 1926 | AUGUST 1926 | SEPTEMBER 1926 | OCTOBER 1926 | NOVEMBER 1926 | DECEMBER 1926 |
|---|---|---|---|---|---|
| S M T W T F S | S M T W T F S | S M T W T F S | S M T W T F S | S M T W T F S | S M T W T F S |
| 1 2 3 | 1 2 3 4 5 6 7 | 1 2 3 4 | 1 2 | 1 2 3 4 5 6 | 1 2 3 4 |
| 4 5 6 7 8 9 10 | 8 9 10 11 12 13 14 | 5 6 7 8 9 10 11 | 3 4 5 6 7 8 9 | 7 8 9 10 11 12 13 | 5 6 7 8 9 10 11 |
| 11 12 13 14 15 16 17 | 15 16 17 18 19 20 21 | 12 13 14 15 16 17 18 | 10 11 12 13 14 15 16 | 14 15 16 17 18 19 20 | 12 13 14 15 16 17 18 |
| 18 19 20 21 22 23 24 | 22 23 24 25 26 27 28 | 19 20 21 22 23 24 25 | 17 18 19 20 21 22 23 | 21 22 23 24 25 26 27 | 19 20 21 22 23 24 25 |
| 25 26 27 28 29 30 31 | 29 30 31 | 26 27 28 29 30 | 24/31 25 26 27 28 29 30 | 28 29 30 | 26 27 28 29 30 31 |

Trackless Floor Dressing

| JANUARY 1927 | FEBRUARY 1927 | MARCH 1927 | APRIL 1927 |
|---|---|---|---|
| SUN MON TUE WED THU FRI SAT | SUN MON TUE WED THU FRI SAT | SUN MON TUE WED THU FRI SAT | SUN MON TUE WED THU FRI SAT |
| . . . . . . 1 | . . 1 2 3 4 5 | . . 1 2 3 4 5 | . . . . . 1 2 |
| 2 3 4 5 6 7 8 | 6 7 8 9 10 11 12 | 6 7 8 9 10 11 12 | 3 4 5 6 7 8 9 |
| 9 10 11 12 13 14 15 | 13 14 15 16 17 18 19 | 13 14 15 16 17 18 19 | 10 11 12 13 14 15 16 |
| 16 17 18 19 20 21 22 | 20 21 22 23 24 25 26 | 20 21 22 23 24 25 26 | 17 18 19 20 21 22 23 |
| 23/30 24/31 25 26 27 28 29 | 27 28 | 27 28 29 30 31 | 24 25 26 27 28 29 30 |

Pine-O-Cide Anticeptic is Best

| MAY 1927 | JUNE 1927 | JULY 1927 | AUGUST 1927 |
|---|---|---|---|
| SUN MON TUE WED THU FRI SAT | SUN MON TUE WED THU FRI SAT | SUN MON TUE WED THU FRI SAT | SUN MON TUE WED THU FRI SAT |
| 1 2 3 4 5 6 7 | . . . 1 2 3 4 | . . . . . 1 2 | . 1 2 3 4 5 6 |
| 8 9 10 11 12 13 14 | 5 6 7 8 9 10 11 | 3 4 5 6 7 8 9 | 7 8 9 10 11 12 13 |
| 15 16 17 18 19 20 21 | 12 13 14 15 16 17 18 | 10 11 12 13 14 15 16 | 14 15 16 17 18 19 20 |
| 22 23 24 25 26 27 28 | 19 20 21 22 23 24 25 | 17 18 19 20 21 22 23 | 21 22 23 24 25 26 27 |
| 29 30 31 | 26 27 28 29 30 | 24/31 25 26 27 28 29 30 | 28 29 30 31 |

Cocoanut Liquid Soap and Dispensers

| SEPTEMBER 1927 | OCTOBER 1927 | NOVEMBER 1927 | DECEMBER 1927 |
|---|---|---|---|
| SUN MON TUE WED THU FRI SAT | SUN MON TUE WED THU FRI SAT | SUN MON TUE WED THU FRI SAT | SUN MON TUE WED THU FRI SAT |
| . . . . 1 2 3 | . . . . . . 1 | . . 1 2 3 4 5 | . . . . 1 2 3 |
| 4 5 6 7 8 9 10 | 2 3 4 5 6 7 8 | 6 7 8 9 10 11 12 | 4 5 6 7 8 9 10 |
| 11 12 13 14 15 16 17 | 9 10 11 12 13 14 15 | 13 14 15 16 17 18 19 | 11 12 13 14 15 16 17 |
| 18 19 20 21 22 23 24 | 16 17 18 19 20 21 22 | 20 21 22 23 24 25 26 | 18 19 20 21 22 23 24 |
| 25 26 27 28 29 30 31 | 23/30 24/31 25 26 27 28 29 | 27 28 29 30 | 25 26 27 28 29 30 31 |

Premier Wood Filler

| JANUARY 1928 | FEBRUARY 1928 | MARCH 1928 | APRIL 1928 | MAY 1928 | JUNE 1928 |
|---|---|---|---|---|---|
| S M T W T F S | S M T W T F S | S M T W T F S | S M T W T F S | S M T W T F S | S M T W T F S |
| 1 2 3 4 5 6 7 | 1 2 3 4 | 1 2 3 | 1 2 3 4 5 6 7 | 1 2 3 4 5 | 1 2 |
| 8 9 10 11 12 13 14 | 5 6 7 8 9 10 11 | 4 5 6 7 8 9 10 | 8 9 10 11 12 13 14 | 6 7 8 9 10 11 12 | 3 4 5 6 7 8 9 |
| 15 16 17 18 19 20 21 | 12 13 14 15 16 17 18 | 11 12 13 14 15 16 17 | 15 16 17 18 19 20 21 | 13 14 15 16 17 18 19 | 10 11 12 13 14 15 16 |
| 22 23 24 25 26 27 28 | 19 20 21 22 23 24 25 | 18 19 20 21 22 23 24 | 22 23 24 25 26 27 28 | 20 21 22 23 24 25 26 | 17 18 19 20 21 22 23 |
| 29 30 31 | 26 27 28 29 | 25 26 27 28 29 30 31 | 29 30 | 27 28 29 30 31 | 24 25 26 27 28 29 30 |

INVENTOR
*Newton S. Hillyard.*
BY
ATTORNEY

Patented Mar. 6, 1928.

1,661,288

UNITED STATES PATENT OFFICE.

NEWTON S. HILLYARD, OF ST. JOSEPH, MISSOURI.

COMBINATION DESK CALENDAR.

Application filed August 1, 1927. Serial No. 209,734.

My invention relates to calendars for office desk use and more particularly to a device of that character adapted for the display of advertising matter; the principal objects of the invention being to arrange a calendar unit of relatively long term for quick exposure of any part, to store a relatively large number of calendar units in a small space in the calendar device, and to provide for convenient removal of used units for display of fresh units.

A further object is to provide advertising means so related to the calendar elements that attention directed to calendar information will fall on advertising matter.

In accomplishing these objects I have provided improved details of structure, the preferred forms of which are illustrated in the accompanying drawings, wherein:

Fig. 1 is a perspective view of a calendar device comprising an inkstand having calendar elements constructed in accordance with my invention.

Fig. 2 is a longitudinal section of the calendar device.

Fig. 3 is an enlarged detail perspective view of a shaft and one of the bearing members for supporting a calendar cylinder, the shaft being shown fragmentarily.

Fig. 7 is a detail view of a calendrical sheet, of which a plurality, each representing a different period, are provided.

Figure 4:
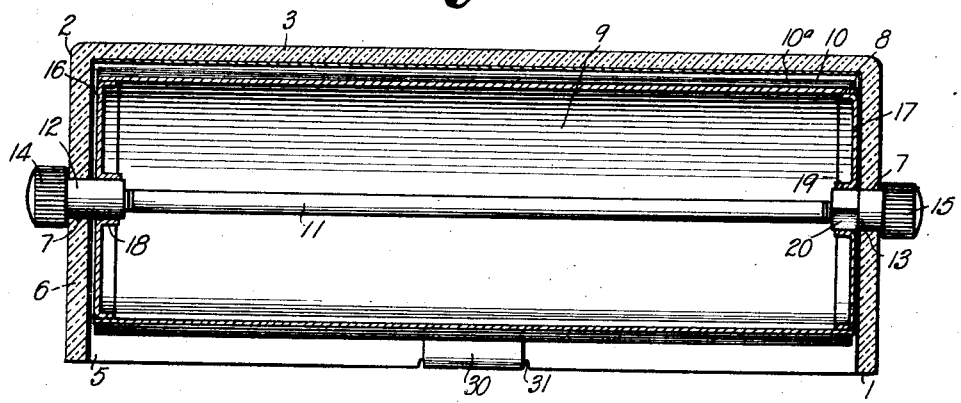
Fig. 4 is a cross section of the calendar element and the housing in which it is supported.

Referring in detail to the drawings:

1 designates a base or supporting element, preferably an item of office desk equipment, and illustrated as an inkstand. The supporting element is preferably formed wholly of glass. A hollow housing member 2 is provided, preferably integral with the inkstand, comprising the upper arcuate or semi-tubular wall 3 and the vertical rear wall 4, the lower edge 5 of the rear wall constituting the rear supporting wall of the inkstand. The supporting element 1 is also provided with side walls, such as 6, which enclose the ends of the housing 2 and have opposite bearing openings 7. A calendar element 8 is rotatably mounted and supported in the housing and on the side walls, as will be more particularly described.

The calendar element 8 comprises a body member 9 consisting preferably of a cylindrical roller, or drum, which may be of wood or metal, calendar sheets or units 10 mounted in tubular form on the body member, and a supporting shaft 11 extending axially through the body member.

The shaft is provided with hubs 12 and 13, screw-threadedly engaged on opposite ends of the shaft for rotatable mounting in the bearing openings 7 of the side walls, for supporting the shaft and the roller on the base. The hubs are provided with operating buttons 14 and 15.

End plates 16 and 17 are provided on the ends of the body member, the plate 16 having an axial annular bearing flange 18 and the plate 17 having an axial square bearing flange 19. The hubs 12 and 13 are slidable in the bearings 18 and 19; the hub 13, however, being provided with a squared head 20 seatable in the squared bearing 19 whereby rotation of the shaft may cause rotation of the body member and its supported calendar sheets. The shaft members are so provided that a hub member may be released by unscrewing it from the shaft for removal of the shaft from the roller so that the roller may be removed from the housing through the open bottom thereof.

Figure 5:
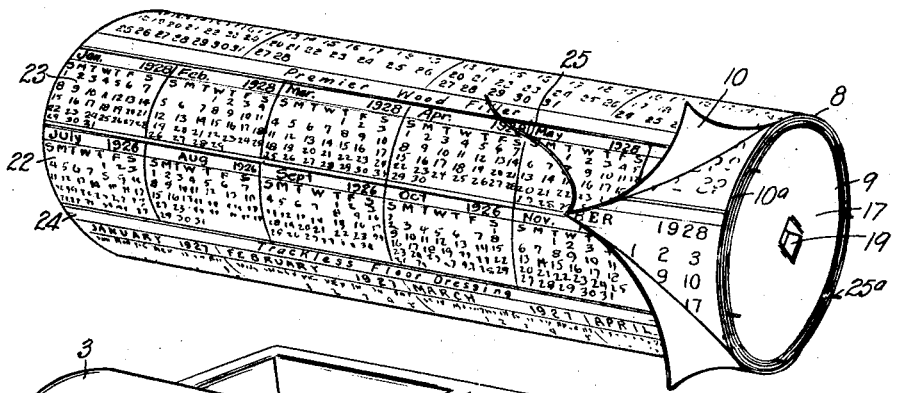
Fig. 5 is a perspective view of the calendar cylinder illustrating the mounting of separate calendrical sheets on a cylindrical body member.

An example of the calendar sheets 10 is illustrated in plane position and in detail in Fig. 7, while Figs. 2, 4 and 5 disclose the plurality of sheets, such as 10, 10$^a$, etc., mounted in tubular form on the roller, one upon another. Each sheet or calendar unit is provided with a number of transverse panels or divisions 21 spaced from each other and having thereon the symbol notations representing days, weeks and months of a year; and with divisions 22 and 23 spaced from and positioned respectively above and below said panels 21, and displaying symbols of respectively adjacent calendrical periods. Between the spaced divisions 21, and between adjacent divisions 21 and 22, and 21 and 23, are sections designated 24 adapted to receive advertising matter, informative material, or any matter which may desirably be brought to the attention of a person consulting the calendar.

The divisions 21 are relatively large and are designed to contain calendrical notations in the ordinary month form, transversely disposed, each division carrying, for example, the matter of four months and the group of divisions 21 representing a current year, such as 1927. I prefer to provide two relatively shallow divisions 22 and 23 at the top and bottom of the sheet to receive respectively the calendrical matter pertaining to the second half of the year preceding that represented on the divisions 21, for example, 1926, and the matter representing the first half of the year succeeding that shown in the said divisions 21, or 1928.

The sheets 10, 10$^a$, etc., are mounted on the roller by the joining of the top and bottom edges of a sheet by glue or otherwise to form each sheet into a tube to be supported preferably by frictional or other easily releasable engagement with the roller; the superposed sheets preferably being supported by frictional contact with tubular sheets over which they are positioned.

Means for disengaging, disrupting or severing the sheets so that they may be removed from the roller are provided, and illustrated as threads 25, embedded transversely in the sheets and preferably in the joints formed by the meeting edges of the sheets. An end 25$^a$ of a thread protrudes, to be grasped for effecting the severance.

Figure 6:
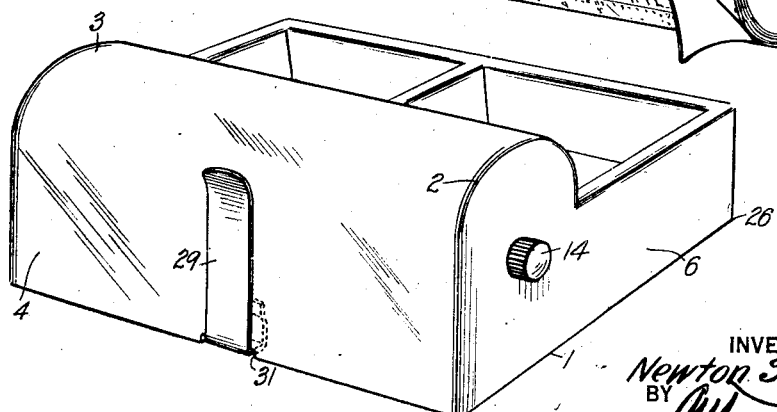
Fig. 6 is a perspective view of a modified form of base or supporting element, illustrating the positioning of the clip in engagement with the housing.

While the housing member 2 may be a separate and integral piece of desk equipment having no accessory utilitarian or ornamental uses, I prefer to illustrate it as part of the housing or inkstand or, as illustrated in Fig. 6, a pin tray 26 or similar device.

When the housing is so associated with a piece of desk equipment, the arcuate wall 3 extends above the upper wall of the inkstand, and the surface of the roller mounted in the housing is visible through the wall 3 from above, from the front, or from the rear through the back wall 4.

I provide as a screen element and as an accessory advertising device a card or like flexible or arcuate plane element 27, to be positioned inside the housing and in contact with the wall 4, and either frictionally or otherwise secured to the inner surface of the housing, the card being provided on its outer face with matter which may be advertising or informative for exposure through the transparent walls of the housing. The card or plane is so positioned that it obstructs the view through the housing from the rear and from above and extending toward the front part of the housing, constitutes the upper edge of a window frame to outline a window or sight opening, designated 28 of the transparent housing.

A clip 29 is provided, having the resilient engaging loop 30, and is engaged preferably with the back wall 4 of the housing, a recess or notch 31 being provided in the lower edge 5 of the wall to receive the clip loop so that the edge 5, having the clip engaged therewith, may seat firmly on a desk.

Card-like elements 32 on which memoranda may be noted associated with calendrical symbols carried by the divisions, are receivable between the clips and the housing to be supported thereby.

In employing the invention a desired number of calendar units representing, for example, the complete calendars for ten years, each year's units having adjacent semi-annual periods also displayed thereon, are provided on the roller and the roller is mounted on the shaft by the removable hub members and rotatably positioned in the housing. The transverse calendar divisions of the outermost sheet on the roller may be selectively exposed through the sight opening, by operating the roller by means of the buttons. The spacing of the divisions provides for the convenient selective observation of symbols on the rotating sheet, and the installation of advertising or informative matter in the sections by which the divisions are spaced employs such spacing usefully without interference with its spacing function.

The provision of the data for six months previous to the current year on each sheet, on the division adjacent the data for the current year and immediately above the same, facilitates consulting those notations; and analogous calendrical matter concerning the six months of a succeeding year positioned below the current data is conveniently available. The limiting of the exposure area by the screen helps in concentration of the attention on the desired and adjacent matter and therefore contributes to the usefulness of the device.

The clip fixed to the rear wall of the housing is useful in connection with the calendar to receive the cards 32 which may carry memoranda associated with the calendar or which may receive articles associated with the use of the supporting element of the calendar device; for example, blotters, when the supporting element is an inkstand.

When the period covered by the notations of the major portion of the sheet has passed, the supporting element is elevated or otherwise positioned to render the roller and the joined ends of the outermost sheet accessible through the open bottom of the housing; the thread 25 of the outermost tubular sheet is grasped by its available end 25$^a$ and caused to rip, disrupt or sever said outermost sheet so that it can be removed from the roller for exposure of the sheet beneath it, having thereon the calendrical notations of a succeeding annual period, such newly exposed sheet constituting a new outermost sheet for the calendar element. The roller thus provided with different data may be rotated as desired to expose the division on which information desired may be carried.

While I have described the invention in the specific terms and illustrations of a roller on which sheets of paper carrying calendrical data are supported in tube-like form, and a housing having bearings for rotatably supporting the roller as an integral part of office desk equipment, the details of structure may be varied without departing from the spirit of my invention, for example, by providing relatively rigid tubular supports for each of the calendrical units, the tubular supports being slidable one upon the other; and similar modifications of the mounting and rotating means.

The housing element that receives the roller may, as stated, be a unit, and may or may not be adapted for positioning adjacent to or in engagement with a piece of office, factory or household equipment. A plurality of sheets or units may be formed integral in a continuous strip or in a plurality of strips to be rolled on the cylindrical support, the unit portions of a strip being suitably secured; and the strip or strips being provided with embedded threads, perforations or other means for severing or disengaging one unit from another. Other than calendrical matter may be installed on one or more units, for example, telephone numbers or similar data, mathematical tables, price lists, etc.; or blank sheets may be provided on which users of the device may install data. Users may attach other elements to the roller for convenient inspection thereof through its operation.

The housing may be inverted or otherwise positioned for access to its open lower portion and the roller rotated, to bring the area of severance of a unit or strip into position for removing a sheet, or to expose a portion for entering a notation. The roller may easily be removed by unthreading a hub member and withdrawing the shaft, for similar purposes or for installing new sheets or tubes. The device may therefore be used over a long period, being supplied with successive groups of calendrical units or with elements to display other matter, with or without the panels having advertising matter. The housing serves to protect the roller and the elements carried thereby from damage or soiling.

What I claim and desire to secure by Letters Patent is:

1. A calendar comprising a roller having thereon a plurality of tubular members, each provided with means for conditioning it independently for removal, and each being further provided with a plurality of spaced calendrical panels and with transverse elements disposed between said panels, and a supporting member having a sight opening, the roller being revolubly carried by the supporting member for displaying said calendrical panels and said transverse elements selectively through said sight opening.

2. A calendar device comprising a supporting element having a sight opening, a member movably mounted within said supporting element, a plurality of tubular elements provided with calendrical indicia mounted one within another on said movable member, and positioned for exposure of portions of the outermost tubular element through said sight opening upon movement of the movable member, and means on each tubular member for disrupting the same for removal from the movable member.

3. A calendar device comprising a supporting element having a transverse sight opening, a rotatable shaft removably mounted within said supporting element, a plurality of tubular elements co-axially mounted and independently secured on said shaft adapted for successive exposure of temporarily outermost elements, each tubular element having divisions provided with display matter, the divisions of the temporarily outermost one of said elements being selectively visible through said sight opening upon rotation of said shaft, and means for dismounting said outermost tubular element to expose the adjacent tubular element.

In testimony whereof I affix my signature.

NEWTON S. HILLYARD.